US007813561B2

(12) United States Patent
Jia et al.

(10) Patent No.: US 7,813,561 B2
(45) Date of Patent: Oct. 12, 2010

(54) AUTOMATIC CLASSIFICATION OF OBJECTS WITHIN IMAGES

(75) Inventors: Menglei Jia, Redmond, WA (US); Hua Li, Beijing (CN); Xing Xie, Beijing (CN); Zheng Chen, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 949 days.

(21) Appl. No.: 11/464,410

(22) Filed: Aug. 14, 2006

(65) Prior Publication Data

US 2008/0037877 A1   Feb. 14, 2008

(51) Int. Cl.
*G06K 9/62* (2006.01)
(52) U.S. Cl. .................. 382/225; 382/224; 382/227; 382/155
(58) Field of Classification Search .......... 382/224–228
See application file for complete search history.

(56) References Cited

U.S. PATENT DOCUMENTS

| | | | | |
|---|---|---|---|---|
| 5,899,999 | A * | 5/1999 | De Bonet | 707/104.1 |
| 5,983,218 | A | 11/1999 | Syeda-Mahmood | |
| 6,563,959 | B1 | 5/2003 | Troyanker | |
| 6,711,293 | B1 * | 3/2004 | Lowe | 382/219 |
| 6,760,714 | B1 * | 7/2004 | Caid et al. | 706/14 |
| 6,996,268 | B2 | 2/2006 | Megiddo et al. | |
| 7,043,474 | B2 | 5/2006 | Mojsilovic et al. | |
| 7,194,134 | B2 * | 3/2007 | Bradshaw | 382/226 |
| 7,394,947 | B2 * | 7/2008 | Li et al. | 382/305 |
| 2003/0110163 | A1 | 6/2003 | Chen et al. | |
| 2003/0135430 | A1 | 7/2003 | Ibbotson | |
| 2005/0223031 | A1 | 10/2005 | Zisserman et al. | |
| 2006/0020597 | A1 | 1/2006 | Keating et al. | |
| 2006/0020714 | A1 | 1/2006 | Girouard et al. | |
| 2006/0080306 | A1 | 4/2006 | Land et al. | |
| 2006/0112092 | A1 | 5/2006 | Ziou et al. | |
| 2006/0112142 | A1 | 5/2006 | Sako et al. | |

OTHER PUBLICATIONS

David G. Lowe, "Distinctive Image Features from Scale-Invariant Keypoints", Jan. 5, 2005, International Journal of Computer Vision, 2004, pp. 1-28.*

Athitsos, Vassilis, Michael J. Swain, "Distinguishing Photographs and Graphics on the World Wide Web," 1997, Workshop on Content-Based Access of Image and Video Libraries, 7 pages.

(Continued)

*Primary Examiner*—Matthew C Bella
*Assistant Examiner*—Eric Rush
(74) *Attorney, Agent, or Firm*—Perkins Coie LLP

(57) ABSTRACT

A system for automatically classifying an object of a target image is provided. A classification system provides a collection of classified images along with a classification of the dominant object of the image. The classification system attempts to classify the object of a target image based on similarity of the target image to the classified images. To classify a target image, the classification system identifies the classified images of the collection that are most similar to the target image based on similarity between salient points of the target image and the classified images. The classification system selects a classification associated with the classified images that are most similar to the target image as a classification for the object of the target image.

15 Claims, 7 Drawing Sheets

OTHER PUBLICATIONS

Chen, Ching-chih and James Z. Wang, "Large-Scale Emperor Digital Library and Semantics-Sensitive Region-Based Retrieval," 5 pages, http://www-db.stanford.edu/~wangz/project/imsearch/SIMPLIcity/DLOC/chen.pdf, 2002.

Chen, Yixin and James Z. Wang, "Image Categorization by Learning and Reasoning with Regions," Journal of Machine Learning Research, vol. 5, 2004, pp. 913-939.

Corel, 2 pages, http://www.corel.com/servlet/Satellite/us/en/Content/1150905725000, [last accessed Feb. 6, 2007].

Csurka, Gabriella et al., "Visual Categorization with Bags of Keypoints," ECCV International Workshop on Statistical Learning in Computer Vision, 2004, 16 pages.

Dorko, Gy and C. Schmid, "Selection of Scale-Invariant Parts for Object Class Recognition," Proceedings of the Ninth IEEE International Conference on Computer Vision (ICCV 2003), © 2003 IEEE, 7 pages.

Fei-Fei, Li, Rob Fergus and Pietro Perona, "Learning Generative Visual Models from Few Training Examples: An Incremental Bayesian Approach Tested on 101 Object Categories," CVPR 2004, Workshop on Generative-Model Based Vision, 9 pages.

Fischler, Martin A. and Robert C. Bolles, "Random Sample Consensus: A Paradigm for Model Fitting with Applications to Image Analysis and Automated Cartography," Communications of the ACM, Jun. 1981, vol. 24, No. 6, © 1981 ACM, pp. 381-395.

Fritzke, Bernd, "Growing Cell Structures—A Self-organizing Network for Unsupervised and Supervised Learning," TR-93-026, Artificial Neural Networks II, May 1993, 36 pages.

Hu, Jianying and Amit Bagga, "Functionality-Based Web Image Categorization," WWW2003, May 20-24, 2003, Budapest, Hungary, 8 pages.

Kadir, Timor and Michael Brady, "Saliency, Scale and Image Description," International Journal of Computer Vision, 45(2), 2001, © 2001 Kluwer Academic Publishers, pp. 83-105.

Kadir, Timor, Andrew Zisserman and Michael Brady, "An affine invariant salient region detector," In ECCV'04, 2004, 14 pages.

Ke, Yan et al., "Efficient Near-duplicate Detection and Sub-image Retrieval," MM'04, Oct. 2004, New York, © 2004 ACM, 8 pages.

Leibe, Bastian and Bernt Schiele, "Analyzing Appearance and Contour Based Methods for Object Categorization," Proc. IEEE Conference on Computer Vision and Pattern Recognition (CVPR'03), Madison, Jun. 2003, 7 pages.

Leibe, Bastian and Bernt Schiele, "Scale Invariant Object Categorization using a Scale-Adaptive Mean-Shift Search," In DAGM'04, Pattern Recognition Symposium, Tubingen, Germany, Aug. 2004, 8 pages.

Lienhart, Rainer and Alexander Hartmann, "Classifying images on the web automatically," Journal of Electronic Imaging, vol. 11 (4), Oct. 2002, © 2002 SPIE and IS&T, pp. 1-10.

Lisin, Dimitri A. et al., "Combining Local and Global Image Features for Object Class Recognition," In CVPR'05, 2005, 8 pages.

Lowe, David G., "Distinctive Image Features from Scale-Invariant Keypoints," Jan. 5, 2004, International Journal of Computer Vision, 2004, 28 pages.

Matas, J. et al ., "Robust Wide Baseline Stereo from Maximally Stable Extremal Regions," In BMVC 2002, pp. 384-393.

Mikolajczyk, Krystian and Cordelia Schmid, "A performance evaluation of local descriptors," 2003, 7 pages.

Mikolajczyk, Krystian and Cordelia Schmid, "Scale & Affine Invariant Interest Point Detectors," International Journal of Computer Vision, 60 (1), 2004, © 2004 Kluwer Academic Publishers, pp. 63-86.

Mikolajczyk, Krystian, Bastian Leibe and Bernt Schiele, "Local Features for Object Class Recognition," In ICCV'05, 2005, pp. 1792-1799.

Mortensen, Eric N. et al., "A SIFT Descriptor with Global Context," In CVPR'05, © 2005 IEEE, pp. 184-190.

Mukherjea, Sougata, Kyoji Hirata and Yoshinori Hara, "Using Clustering and Visualization for Refining the Results of a WWW Image Search Engine," NPIV 98, Bethesda, Maryland, ©ACM 2000, pp. 29-35.

Smith, John R. and Shih-Fu Chang, "Tools and Techniques for Color Image Retrieval," Feb. 1, 1996, IS&T/SPIE Proceedings, vol. 2670, Storage & Retrieval for Image and Video Databases IV, pp. 1-12, http://www.ee.columbia.edu/dvmm/publications/96/smith96b.pdf.

Smith, John R. and Shih-Fu Chang, "VisualSEEk: a fully automated content-based image query system," ACM Multimedia '96, Boston, MA, Nov. 20, 1996, 12 pages, http://www.ee.columbia.edu/dvmm/publications/96/smith96f.pdf.

Tuytelaars, Tinne and Luc Van Goal, "Matching Widely Separated Views Based on Affine Invariant Regions," IJCV, 2004, 59(1), © 2004 Kluwer Academic Publishers, pp. 61-85.

Vailaya, Aditya et al., "Image Classification for Content-Based Indexing," IEEE Transactions on Image Processing, Jan. 2001, 10 (1), © 2001 IEEE, pp. 117-130.

Winn, J. A. Criminisi and T. Minka, "Object Categorization by Learned Universal Visual Dictionary," In ICCV'05, 2005, pp. 1800-1807.

Zhang, Wei et al., "Object Class Recognition Using Multiple Layer Boosting with Heterogeneous Features," In CVPR'05, 2005, pp. 323-330.

\* cited by examiner

AUTOMATIC CLASSIFICATION OF OBJECTS WITHIN IMAGES

BACKGROUND

The automatic classification of images has become increasingly important as the number of images provided by web pages increases. The classification of images has many different applications. For example, a search engine service that provides image searching may attempt to classify images to make searching both more efficient and more effective. The search engine service may classify images into a hierarchy of image classifications (e.g., geography, North America, United States, and so on). The image search engine service may allow a user to specify both a search request (or query) and classifications of the images of interest (e.g., a query of "sunset" and a classification of "North America"). The image search engine service can then limit its searching to images within those specified classifications. Another example where classification of images may be helpful is a web marketplace. A web marketplace system may allow many different retailers to advertise and sell their products. The retailers may provide a database of their products, which may include, for each product, pricing information, description of the product, and the image of the product. Different retailers may describe the products in different ways so that it is difficult for the marketplace system to properly classify the products that are available for sale. If the marketplace system were able to effectively identify a classification by analyzing the image of the product, the marketplace system could use that classification to help classify the product.

Many different techniques have been applied to classifying images. Some techniques classify images based on text that is near the image. For example, a web page may include a title of the image and descriptive text. The accuracy of such techniques depends not only on the ability to accurately identify the title and associated descriptive text but also on the accuracy of the title and descriptive text in representing the image. Because of the wide variety of web page formats, it can be difficult to identify text relating to an image. Also, the text relating to an image may give very little information to help with classification. Moreover, such techniques are not particularly useful for a marketplace system when the various retailers use incomplete, ambiguous, and incorrect descriptions. Other techniques classify images based on the content of the image itself. Such techniques are referred to as content based image retrieval ("CBIR") systems. CBIR systems attempt to classify images based on characteristics such as color, shape, and texture. Unfortunately, the precision of CBIR systems has been unsatisfactory because it is difficult to identify a classification from the low-level characteristics of an image.

SUMMARY

A system for automatically classifying an object of a target image is provided. A classification system provides a collection of classified images along with a classification of the dominant object of the images. The classification system attempts to classify the object of a target image based on similarity of the target image to the classified images. To classify a target image, the classification system identifies the classified images that are most similar to the target image. The classification system bases similarity on the similarity between salient points of the target image and the classified images. The classification system represents each salient point by a feature vector and uses a distance metric to determine similarity between feature vectors. The classification system uses a similarity metric derived from the distance metric of the feature vectors to determine similarity between the target image and the classified images. The classification system selects a classification associated with the classified images that are most similar to the target image as a classification for the object of the target image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
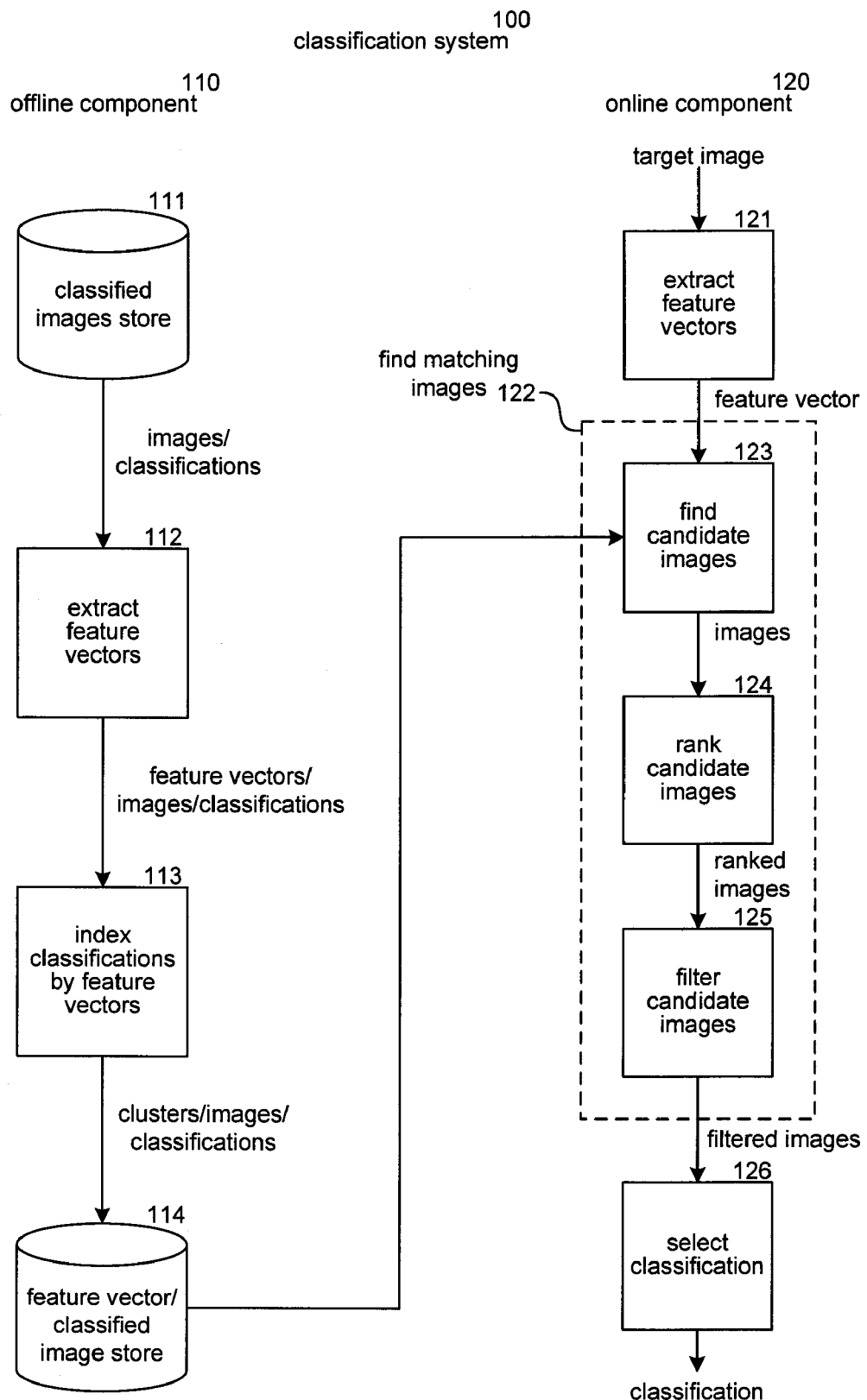
FIG. 1 is a block diagram illustrating components of the classification system in one embodiment.

A system for automatically classifying an object within a target image is provided. In one embodiment, a classification system provides a collection of images along with a classification of the dominant object of the images. "Object" refers to anything that can be depicted in an image (e.g., automobile, laptop computer, lion, unicorn, and so on) and especially physical objects. The collection of images ("classified images") may be generated in various ways such as manually by providing the classifications of the images or automatically by deriving the classifications from images with product descriptions that are known to be accurate. For example, the collection of images may include a picture of an electric guitar that is for sale along with the classification of guitar and a picture of a mountain bike along with a classification of bicycle. The classification system attempts to classify an object of a target image based on similarity of the target image to the images of the collection. To classify a target image, the classification system identifies the images of the collection that are most similar to the target image. For example, the target image may contain the image of a classical guitar. The classification system may identify images of the collection that contain classical guitars and electric guitars as being the most similar. The classification system then selects a classification associated with the identified images of the collection as a classification for the object of the target image. For example, if most of the identified images have the classification of guitar, then the classification system would select the classification of guitar for the object of the target image. In this way, the classification system can automatically classify objects of images without having to rely on either the accuracy of extracting relevant text surrounding the image or the accuracy of the text itself in describing the image.

In one embodiment, the classification system includes an offline component and an online component. The offline component preprocesses the classified images to facilitate the identification of images similar to a target image. The offline component identifies the salient points of the classified images and generates a mapping between similar salient points of the classified images to the classified images that contain those salient points. To classify a target image, the online component identifies the salient points of the target image, identifies classified images that have similar salient points, and selects the classification of the target image based on the classification of the identified classified images.

The offline component preprocesses the classified images by first identifying the salient points of the classified images. A salient point refers to an area of an image that can automatically be detected as containing content that can be used to distinguish one image from another image. For example, the salient points within an image of a guitar may include various points along its neck (e.g., frets and tuning pegs) and various points of the body (e.g., bridge and pick guard). As described below, many well-known techniques are available to identify such salient points. The offline component generates a feature vector to represent the features of each salient point. A feature vector is thus a multidimensional representation of a salient point. For example, a feature vector may include features (or entries) based on color or contrast of a salient point. The classification system determines similarity between salient points based on the similarity of their feature vectors. The offline component generates a mapping of the feature vectors to the classified images that contain the corresponding salient points. The offline component may also generate an index that groups similar feature vectors. The offline component may use a clustering technique to generate the index. The clustering of similar feature vectors helps the online component to quickly identify salient points of classified images that are similar to salient points of a target image.

The online component classifies an object of the target image using the index and mapping generated by the offline component. The online component receives a target image that includes an object, identifies the salient points of the target image, and generates a feature vector for each salient point. The online component then uses the index and mapping to identify candidate classified images, for example, classified images containing one or more salient points that are similar to the salient points of the target image based on similarity of their feature vectors. For example, the online component may identify 20 candidate classified images. When the object of the target image is an electric guitar, then the 20 candidate classified images may include images of an electric guitar, a classical guitar, and a tennis racket. The online component evaluates the similarity between the target image and the candidate classified images to discard those candidate classified images whose similarity is below a threshold. For example, the online component may discard images of a tennis racket because the target image of an electric guitar and the classified image of a tennis racket may only have a few similar salient points. The online component may then filter out candidate classified images whose similar salient points are arranged differently from (e.g., inconsistent with) the corresponding salient points of the target image. For example, the target image may have several salient points aligned in a line (e.g., string crossing over frets of a guitar neck), and a matching classified image may have the corresponding similar salient points arranged in a grid (e.g., intersecting strings of a tennis racket). In such a case, the online component may disregard that candidate classified image because of the inconsistent arrangement. The remaining candidate classified images are considered to be matching classified images in that the objects of the matching classified images are considered to match the object of the target image. The online component analyzes the classifications of the matching classified images and selects a classification for the object of the target image. For example, if a majority of the matching classified images have the same classification, then the online component identifies that classification as the classification for the object of the target image. In contrast, if each of the classifications of the matching classified images is associated with approximately the same number of matching classified images, then the online component may report that it cannot classify the object of the target image into a single classification. If the classifications are hierarchical, then online component may further analyze the multiple classifications to determine whether they represent related classifications (e.g., ancestor and descendant classifications or sibling classifications). For example, if the classifications of matching classified images are equally divided between the sibling classifications of classical guitar and electric guitar, then the online component may classify the object of the target image as the parent classification of guitar. Also, if the classifications of the matching classified images are equally divided between the parent and child classifications of guitar and electric guitar, then the online component may classify the object of the target image as the child classification of electric guitar.

FIG. 1 is a block diagram illustrating components of the classification system in one embodiment. The classification system 100 includes an offline component 110 and an online component 120. The offline component includes a classified images store 111, an extract feature vectors component 112, an index classifications by feature vectors component 113, and a feature vector/classified image store 114. The classified images store contains the collections of classified images along with their classifications. The extract features vectors component identifies the salient points of the classified images and generates the feature vectors for the salient points. The offline component may use various types of detectors to identify the salient points of the classified images. These detectors may include a difference of Gaussian ("DoG") region detector, a Hessian-affine region detector, a Harris-affine region detector, a maximally stable extremal region ("MSER") detector, an intensity-based extrema region ("IBR") detector, or an edge-based regions ("EBR") detector. The classification system may be implemented using any type or combination of types of detectors, including others than those listed above.

In one embodiment, the offline component (and the online component) identifies salient points and extracts their features using a scale-invariant feature transform technique. A scale-invariant feature transform ("SIFT") technique is described in Lowe, D., "Distinctive Image Features from Scale-Invariant Keypoints," International Journal of Computer Vision, vol. 60, no. 2, pp. 91-110, 2004, which is hereby incorporated by reference. The SIFT technique uses a DoG region detector to identify salient points. The SIFT technique described by Lowe identifies salient points as locations of an image that can be accurately identified regardless of scale of the image and regardless of many different transforms of the image (e.g., different perspective angles and distances). The SIFT technique uses a cascade filtering approach to identify candidate salient points. The SIFT technique identifies locations that can be repeatedly located under differing views of the same object by searching for stable features across all possible scales. The SIFT technique then performs a detailed fit to the nearby data for location, scale, and ratio of principal curvatures for each candidate salient point. The SIFT technique rejects candidate salient points that have low contrast and are poorly localized along an edge. The SIFT technique then generates a local image descriptor (i.e., "feature") for each salient point. The SIFT technique generates features that are orientation invariant by first computing the gradient magnitude and orientation of each image sample in a region around the salient point. The SIFT technique then accumulates these samples into orientation histograms summarizing the content over a 4×4 region. Each histogram may have eight bins representing different orientations, resulting in a feature that is represented by a 128 (4×4×8) feature vector. One skilled in the art will appreciate that other techniques may be used to identify the salient points of an image and the features of the salient points.

The index classification by feature vectors component of the offline component generates a mapping of feature vectors to their corresponding classified images and an index for the feature vectors. The offline component may use various types of indexing mechanisms such as tree-based mechanisms (e.g., R-tree, SS-tree, and SR-tree), hash based mechanisms (e.g., locally sensitive hashing ("LSH"), and scanned based methods (e.g., VA-file and VA+-file). In one embodiment, the offline component uses a cluster-based indexing technique as described in Fritzke, B., "Growing Cell Structures—A Self-Organizing Network for Unsupervised and Supervised Learning," Neural Networks, 7(9), 1994, pp. 1441-1460, which is hereby incorporated by reference. The offline component may calculate the distance between two feature vectors (or similarity between two salient points) according to the following equation:

$$D(X, Y) = \frac{\sqrt{\sum_{i=1}^{128}(x_i - y_i)^2}}{\|X\|_2 \cdot \|Y\|_2} \quad (1)$$

where $X=(x_1, \ldots x_i, \ldots x_{128})$ and $Y=(y_1 \ldots y_i, \ldots y_{128})$ represent the feature vectors and $\|X\|_2$ and $\|Y\|_2$ represent the L2 norms of feature vectors X and Y.

The online component receives a target image, identifies matching classified images, and selects the classification of the object of the target image based on the classifications associated with the matching classified images. The online component includes an extract feature vectors component 121; a find matching images component 122 that includes a find candidate images component 123, a rank candidate images component 124, and a filter candidate images component 125; and a select classification component 126. The extract feature vectors component identifies salient points for a target image and generates feature vectors of the salient points as described above in reference to the extract feature vectors component 112 of the offline component. The find matching images component uses the feature vector/classified image store to identify classified images that match the target image. The find candidate images component identifies candidate classified images that have salient points similar to the salient points of the target image. The rank candidate images component ranks the similarity of the candidate classified images to the target image and discards candidate classified images whose similarity is below a threshold. In one embodiment, the rank candidate images component may represent the similarity between a candidate classified image and the target image according to the following equation:

$$Sim(I, J) = \sum_{i,j} corr(X_i, Y_j) \quad (2)$$

where $I(X_1, \ldots, X_n)$ represents the feature vectors of the target image, $J(Y_1, \ldots, Y_m)$ represents the feature vectors of a classified image, and corr $(X_i, Y_j)$ represents a metric that measures the correspondence between feature vectors. For example, the correspondence can be numerically calculated as the inverted L2 distance of $X_i$ and $Y_j$. In one embodiment, the rank candidate images component uses the binary value 1 or 0 (1 as similar and 0 as not similar) to identify similar feature vectors. The rank candidate images component may alternatively discard all but a fixed number or a fixed percentage of candidate classified images or discard candidate classified images that are not nearly as similar as other data classified candidate images. The filter candidate images component filters out candidate classified images whose salient points are not arranged consistently with the corresponding salient points of a target image. In one embodiment, the filter candidate images component uses a Random Sample Consensus ("RANSAC") algorithm to filter out noise, which can have the effect of verifying the geometric relationship of the salient points. The filter candidate images component may re-rank the candidate images based on the RANSAC analysis. The select classification component inputs the candidate classified images and selects a classification for the object of the target image based on the classification of the largest number of candidate classified images. If, however, the number does not exceed a certain threshold or percentage, the select classification component may indicate that a classification could not be determined. Alternatively, the select classification component may factor in the similarity of the candidate classified images when selecting the classification for the object of the target image. For example, if there are 100 candidate classified images with 50 having the classification of guitar and 50 having the classification of electric guitar but the candidate classified images with the classification of electric guitar have a much higher similarity to the target image, then the select classification component may select the classification of electric guitar for the object of the target image.

Figure 2:
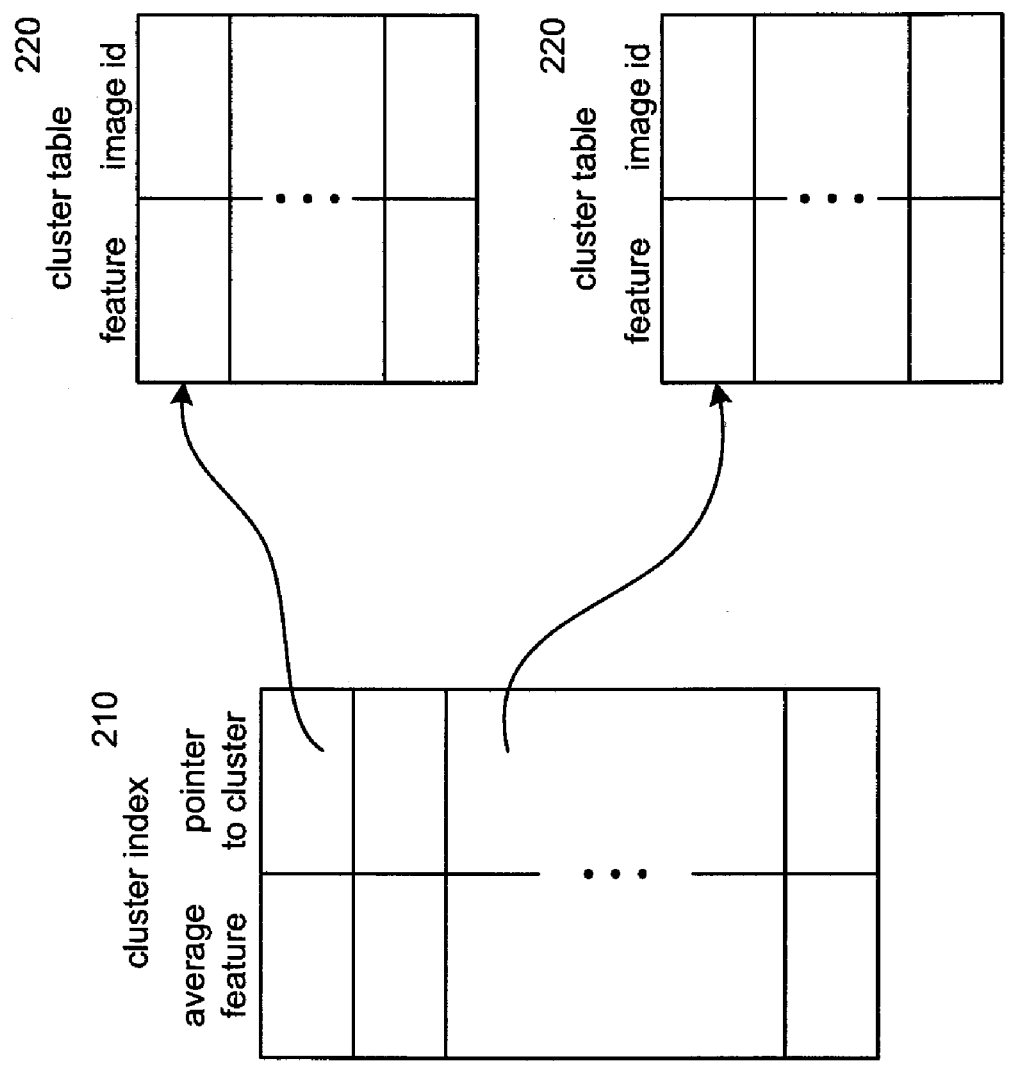
FIG. 2 is a block diagram illustrating a logical representation of the feature vector/classified image store in one embodiment.

FIG. 2 is a block diagram illustrating a logical representation of the feature vector/classified image store in one embodiment. The feature vector/classified image store may include a cluster index 210 and cluster tables 220. The cluster index contains an entry for each cluster of salient points (represented by their feature vectors) of the classified images. Each entry may contain a representative feature vector for the cluster and a pointer to the corresponding cluster table. The representative feature vector may be an average of the feature vectors within the cluster, a median feature vector of the cluster, a centroid feature vector of the cluster, and so on. Each cluster table contains an entry for each salient point within the cluster. Each entry of a cluster table contains the feature vector for the salient point and a reference to the classified image that contains that salient point. To identify candidate classified images, the online component compares the feature vectors of the salient points of a target image to the representative feature vectors within the cluster index. The online component may select the representative feature vector that is closest to the feature vector of a salient point and then select the classified images of the corresponding cluster table with salient points nearest to the salient point of the target image as candidate classified images.

The computing devices on which the classification system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the classification system. In addition, the instructions, data structures, and message structures may be stored or transmitted via a data transmission medium, such as a signal on a communications link. Various communications links may be used, such as the Internet, a local area network, a wide area network, or a point-to-point dial-up connection.

The classification system may be used in and by various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The classification system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the offline component and online components may be implemented on different computing systems. In addition, the online component may be implemented on one computing system and the application that uses the online component may be implemented on another computing system. The applications may include search engine services, product identification systems, image classification systems, robotics systems, and so on. A search engine service may use the online component to assist in the automatic classification of images encountered when crawling the web. A search engine service may also use the online component to classify images input as part of a query. A product identification system may use the online component to assist in classifying products from product descriptions that include images of the products. An image classification system may use the online component to classify images of a collection of images. For example, an image classification system that classifies historical landmarks may classify images into classifications such as the Great Wall of China and the Washington Monument. A robotic system may classify images to help identify objects that the system encounters. For example, a robotic system may need to navigate around an identified object, to move an identified object, to locate an object of interest, and so on.

Figure 3:
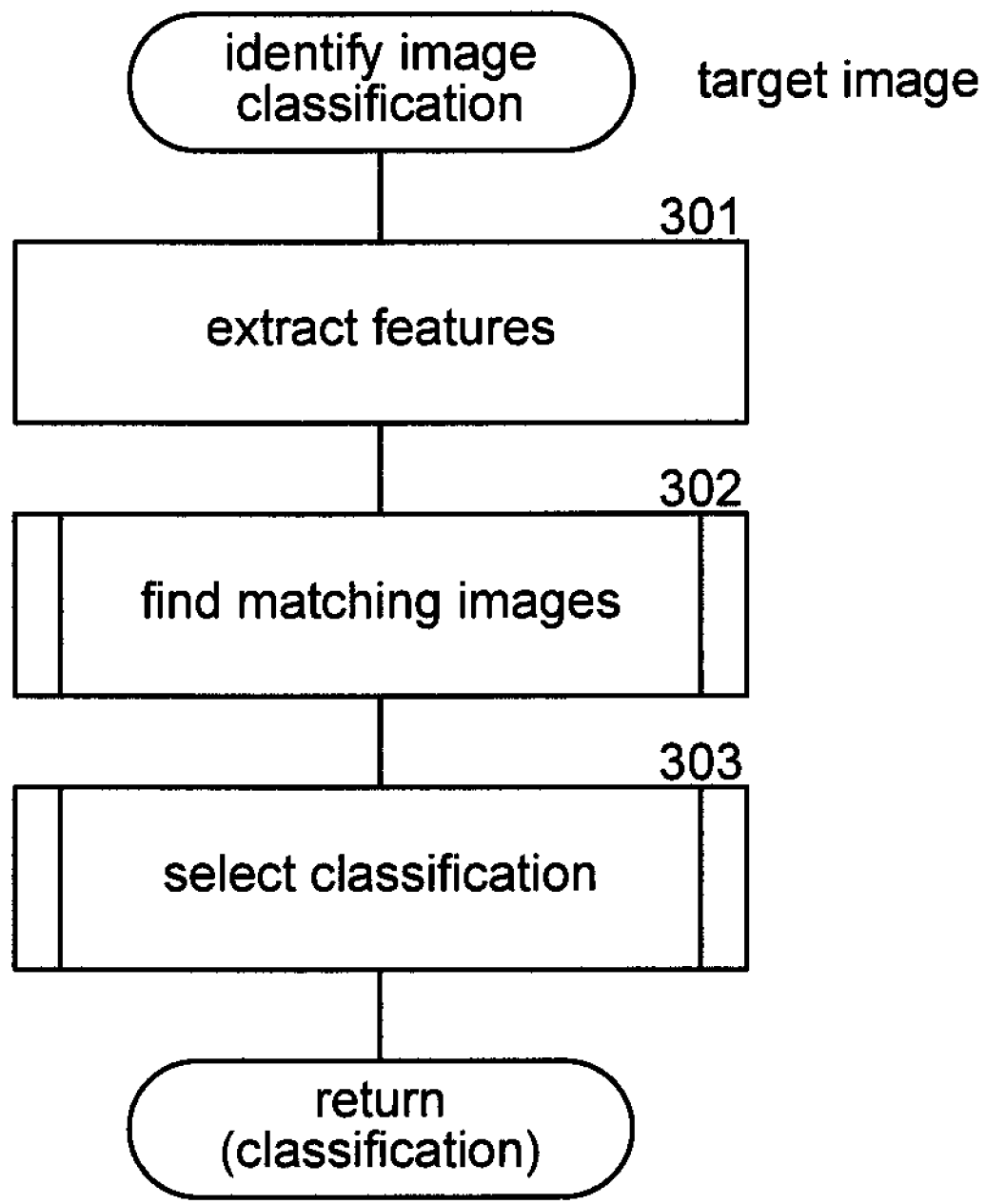
FIG. 3 is a flow diagram that illustrates the overall processing of the online component that identifies image classifications of the classification system in one embodiment.

FIG. 3 is a flow diagram that illustrates the overall processing of the online component that identifies image classifications of the classification system in one embodiment. The component is passed a target image of an object and identifies a classification for the object of the target image based on similarity of the target image to previously classified images. In block 301, the component identifies the salient points of the target image and generates the feature vector for each salient point. In block 302, the component invokes the find matching images component to identify the classified images that best match the target image. In block 303, the component invokes the select classification component to select a classification for the target image based on the classification of the matching classified images. The component then returns the selected classification as the classification for the object of the target image.

Figure 4:
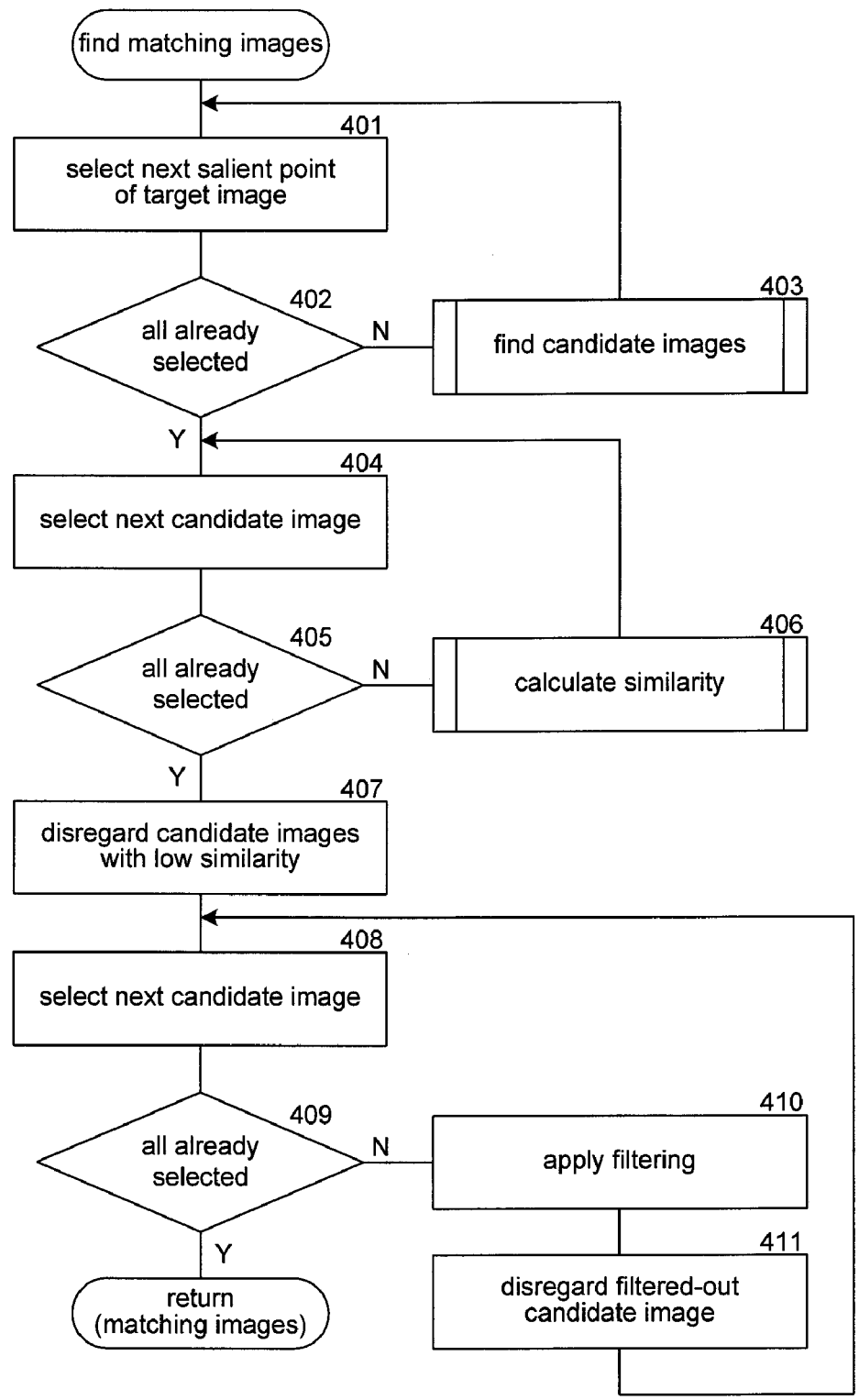
FIG. 4 is a flow diagram that illustrates the processing of the find matching images component of the online component of the classification system in one embodiment.

FIG. 4 is a flow diagram that illustrates the processing of the find matching images component of the online component of the classification system in one embodiment. The component is passed feature vectors of the salient points of a target image and returns a classification for the object of the target image based on similarity of the feature vectors to salient points of the classified images. In blocks 401-403, the component loops identifying candidate classified images with salient points similar to those of the target image. In block 401, the component selects the next salient point (represented by its feature vector) of the target image. In decision block 402, if all the salient points of the target image have already been selected, then the component continues at block 404, else the component continues at block 403. In block 403, the component invokes the find candidate images component to identify classified images with salient points similar to the selected salient point of the target image. The component then loops to block 401 to select the next salient point of the target image. In blocks 404-406, the component loops selecting the candidate classified images and calculating the similarity of the candidate classified images to the target image. In block 404, the component selects the next candidate classified image. In decision block 405, if all the candidate classified images have already been selected, then the component continues at block 407, else the component continues at block 406. In block 406, the component invokes a calculate similarity component to calculate the similarity between the selected candidate classified image and the target image. The component then loops to block 404 to select the next candidate classified image. In block 407, the component disregards candidate classified images with a low similarity to the target image. In blocks 408-411, the component loops filtering out candidate classified images whose arrangement of salient points is inconsistent (e.g., geometrically) with the arrangement of the corresponding salient points of the target image. In block 408, the component selects the next candidate classified image. In decision block 409, if all the candidate classified images have already been selected, then the component returns the candidate classified images that have not been disregarded as the matching classified images, else the component continues at block 410. In block 410, the component applies the filtering (e.g., RANSAC) to identify candidate classified images whose salient points are arranged inconsistently with the corresponding salient points of the target image. In block 411, the component disregards the identified candidate classified images and then loops to block 408 to select the next candidate classified image.

Figure 5:
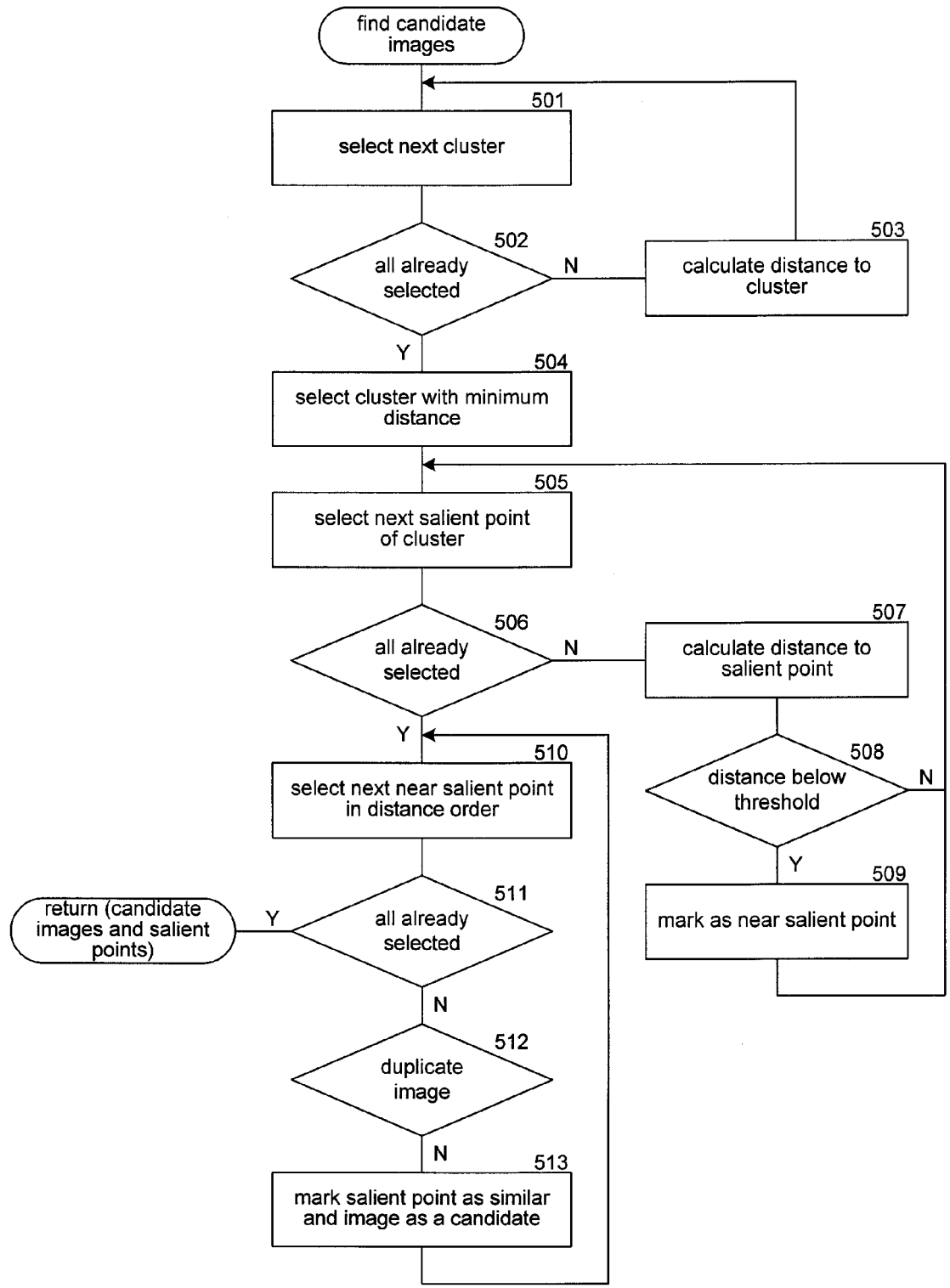
FIG. 5 is a flow diagram that illustrates the processing of the find candidate images component of the online component of the classification system in one embodiment.

FIG. 5 is a flow diagram that illustrates the processing of the find candidate images component of the online component of the classification system in one embodiment. The component is passed the salient points of a target image and identifies candidate classified images. The component returns an indication of the candidate classified images along with their salient points that are similar to salient points of the target image. For each salient point of the target image, the component identifies the most similar cluster of the salient points of the classified images. The component then identifies the nearest salient points within the cluster to that salient point of the target image. The component may use various algorithms to identify the nearest salient points. The component may use an N—N algorithm that identifies the N nearest salient points regardless of the classified images that contain the nearest salient point. The N-N algorithm may thus identify multiple salient points of a single classified image. Alternatively, the component may use an N-1 algorithm that identifies the nearest salient points but only identifies one salient point from each classified image. The component may also use an Ambiguity Rejection ("AR") algorithm that rejects a salient point of a classified image as being similar when that salient point is near another salient point of the classified image. The AR algorithm is based on the assumption that each salient point of the target image only has one corresponding salient point in a candidate classified image. In blocks 501-503, the component loops calculating the distance between the passed salient point and each cluster. In block 501, the component selects the next cluster. In decision block 502, if all the clusters have already been selected, then the component continues at block 504, else the component continues at block 503. In block 503, the component calculates the distance from the passed salient point to the selected cluster and then loops to block 501 to select the next cluster. In block 504, the component selects the cluster with the smallest distance to the passed salient point. In blocks 505-509, the component loops identifying the salient points of the selected cluster that are near the passed salient point. In block 505, the component selects the next salient point of the cluster. In decision block 506, if all the salient points of the cluster have already been selected, then the component continues at block 510, else the component continues at block 507. In block 507, the component calculates the distance from the passed salient point to the selected salient point. In decision block 508, if the distance is below a threshold, then the component continues at block 509, else the component loops to block 505 to select the next salient point of the selected cluster. In block 509, the component marks the selected salient point of the cluster as a near salient point and then loops to block 505 to select the next salient point of the selected cluster. In blocks 510-513, the component loops marking near salient points and marking classified images as candidates using an N-1 algorithm. In block 510, the component selects the next near salient point in distance order. The selection in distance ordering ensures that the salient point of each classified image that is nearest to the passed salient point is selected. In decision block 511, if all the near salient points have already been selected, then the component returns the classified images marked as candidates along with a marked salient point for each, else the component continues at block 512. The online component uses the marked salient points to determine similarity between the target image and a candidate classified image. In decision block 512, if the classified image of the selected near salient point corresponds to a classified image previously marked as a candidate, then the component loops to block 510 to select the next near salient point, else the component continues at block 513. In block 513, the component marks the selected salient point and its classified image as being a candidate. The component then loops to block 510 to select the next near salient point.

Figure 6:
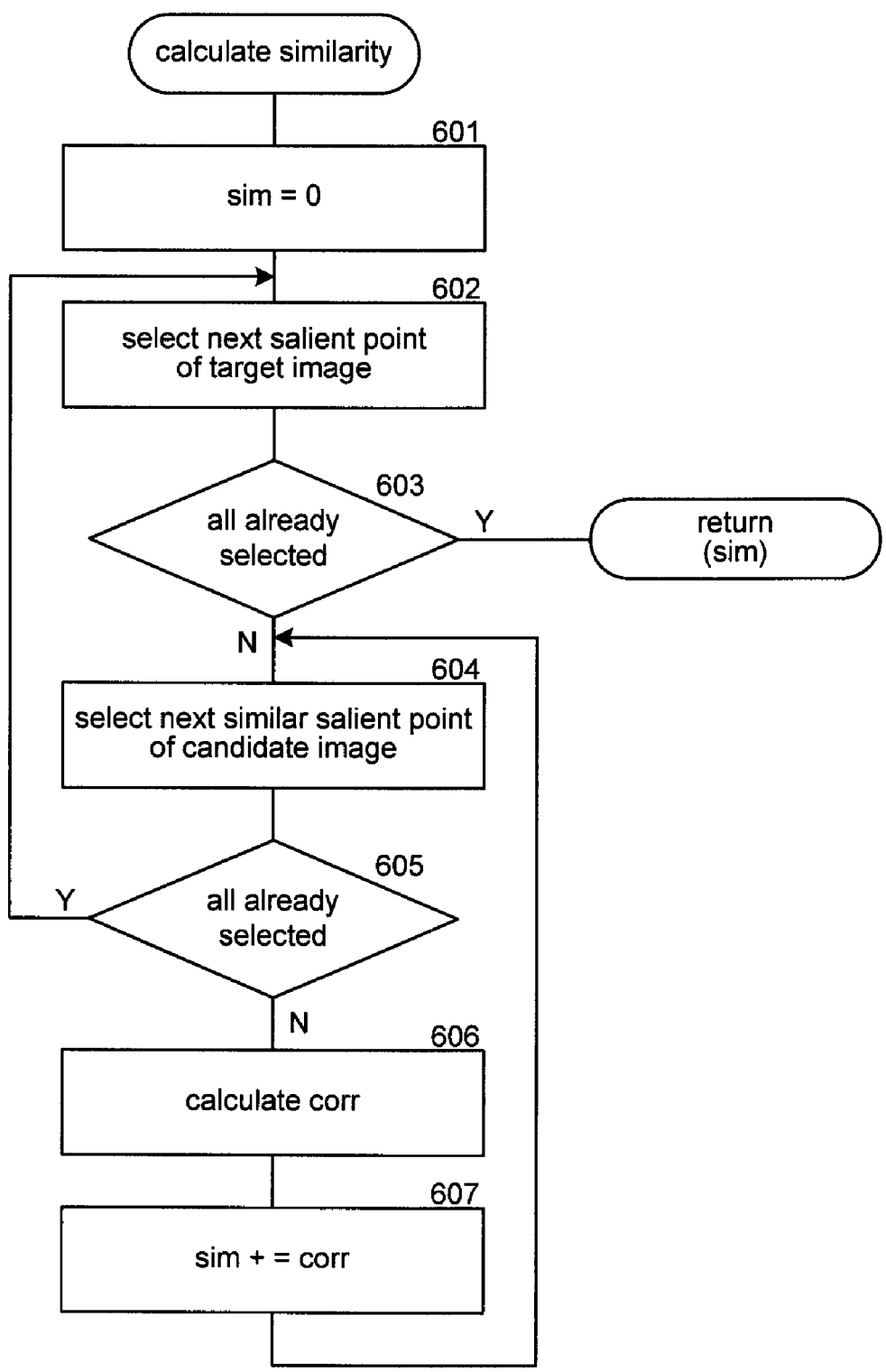
FIG. 6 is a flow diagram that illustrates the processing of the calculate similarity component of the online component of the classification system in one embodiment.

FIG. 6 is a flow diagram that illustrates the processing of the calculate similarity component of the online component of the classification system in one embodiment. The component is passed a target image and a candidate classified image and calculates the similarity between the images. In block 601, the component initializes the similarity to zero. In blocks 602-607, the component loops selecting the salient points of the target image and accumulating the similarity based on the marked salient points of the candidate classified image. Even when an N-1 algorithm is used, a candidate classified image may have multiple marked salient points. For example, when a candidate classified image is identical to the target image, it may have a marked salient point for each salient point of the target image. In block 602, the component selects the next salient point of the target image. In decision block 603, if all the salient points of the target image have already been selected, then the component returns the accumulated similarity, else the component continues at block 604. In block 604, the component selects the next marked salient point of the candidate classified image. In decision block 605, if all the marked salient points of the candidate classified image have already been selected, then the component loops to block 602 to select the next salient point of the target image, else the component continues at block 606. In block 606, the component calculates a correlation between the selected salient points of the target image and the candidate classified image. In block 607, the component aggregates the correspondence into a similarity score and then loops to block 604 to select the next marked salient point of the candidate classified image.

Figure 7:
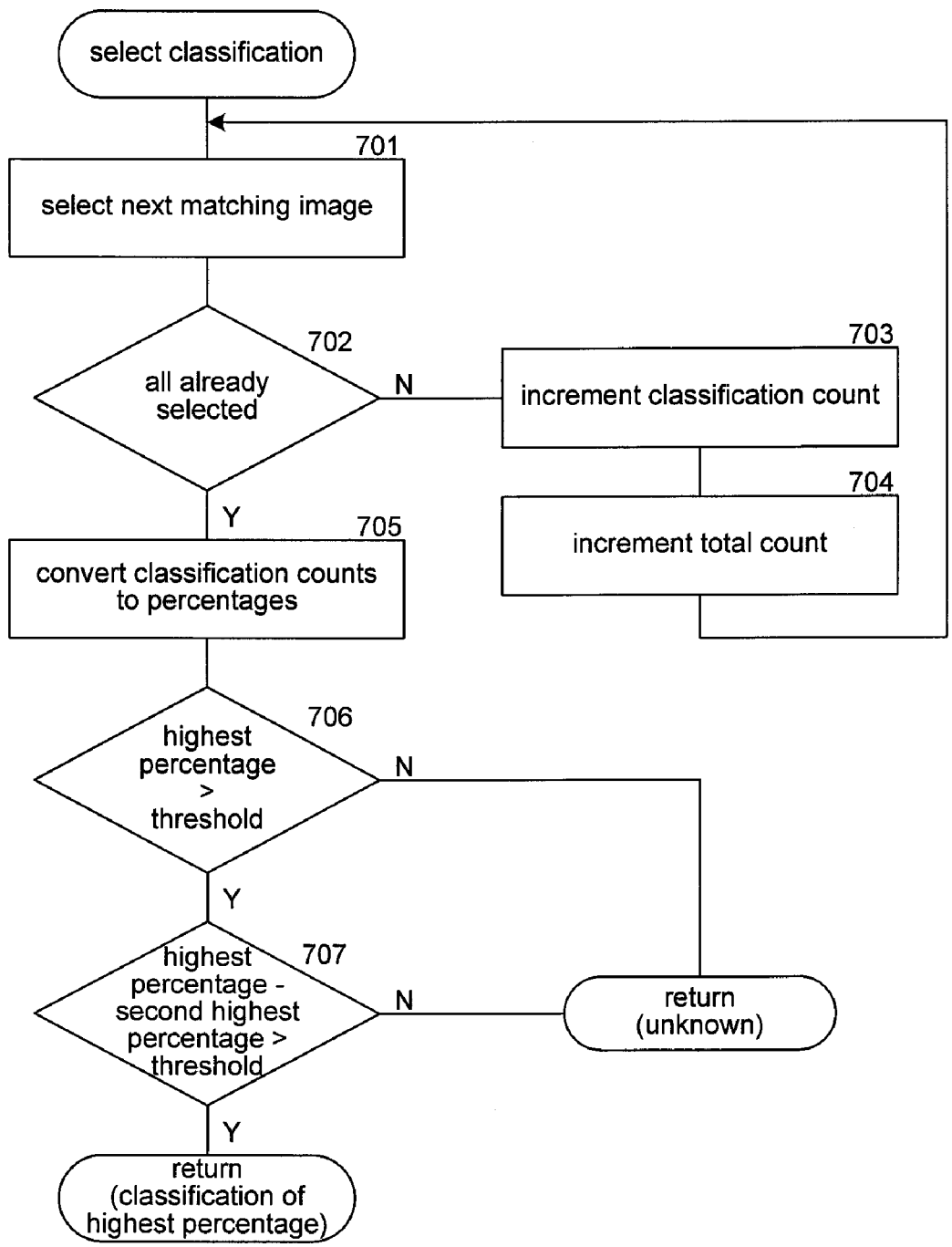
FIG. 7 is a flow diagram that illustrates the processing of the select classification component of the online component of the classification system in one embodiment.

FIG. 7 is a flow diagram that illustrates the processing of the select classification component of the online component of the classification system in one embodiment. The component is passed the matching classified images and either selects a classification for the object of the target image (i.e., a dominant classification) or indicates that a classification cannot be determined. In blocks 701-704, the component accumulates a count of the number of matching candidate images with each classification. In block 701, the component selects the next matching classified image. In decision block 702, if all the matching classified images have already been selected, then the component continues at block 705, else the component continues at block 703. In block 703, the component increments a count for the classification of the selected matching classified image. In block 704, the component increments the total count of the matching classified images and then loops to block 701 to select the next matching classified image. In block 705, the component converts the counts of the classifications to percentages by dividing the count of each classification by the total count of the matching classified images. In decision block 706, if the highest percentage is greater than a threshold, then the classification of that percentage is a candidate classification for the target image and the component continues at block 707, else the component returns an indication that a classification for the object of the target image cannot be determined. In decision block 707, if the distance between the highest percentage of a classification and the second-highest percentage of a classification is greater than a threshold, then the component can uniquely identify a classification and returns the classification with the highest percentage as the classification for the object of the target image, else the component returns an indication that the classification for the object of the target image cannot be determined.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The classification system may be implemented using different components, changing the processing order of the components, and so on. For example, the ordering of the rank candidate images component and the filter candidate images component may be interchanged. Also, the components of the offline component may alternatively be implemented online depending on the processing power of the computing system and the nature of the classification problem. For example, the feature vector/classified image store may be incrementally updated online to reflect new classifications of images. Also, the classification system may use a learning algorithm to train a classifier to classify target objects based on their salient points. The classification may use the data of the feature vector/classified image store as training data to train the classifier. Accordingly, the invention is not limited except as by the appended claims.

We claim:

1. A method in a computing device for classifying an object of a target image, the method comprising:

providing classified images and an associated classification for each classified image, the associated classification indicating a classification of an object represented by the classified image, each classified image being represented by feature vectors of salient points of the image;

providing a plurality of clusters of the salient points of the classified images, each cluster having salient points of a plurality of classified images whose feature vectors are within a threshold similarity of a representative feature vector of the cluster, each cluster having a mapping of each salient point of the cluster to the classified image that contains that salient point; and after the clusters have been provided, identifying target salient points of the target image;

generating a target feature vector for each target salient point;

identifying candidate images by, for each target salient point:

selecting the cluster whose salient points are most similar to the target salient point as indicated by a minimum distance between a feature vector of a salient point of the cluster and the target feature vector;

identifying near salient points of the selected cluster whose distance between the feature vector of the salient point and the target feature vector is below a threshold; and marking images that contain the identified near salient points as candidate images;

identifying classified images that are most similar to the target image by calculating a similarity between each candidate image and the target image based on similarity between feature vectors of salient points of the candidate image and the target feature vectors;

discarding candidate images whose calculated similarity does not satisfy a threshold similarity; and after discarding the candidate images, filtering out candidate images whose arrangement of salient points is inconsistent with corresponding target salient points wherein the remaining candidate images are the identified classified images; and selecting a classification for the object of the target image based on the classifications of the identified classified images.

2. The method of claim 1 wherein each salient point is identified using a difference of Gaussian technique and represented by a feature vector.

3. The method of claim 1 wherein the mapping is generated using a clustering technique.

4. The method of claim 3 wherein the clustering technique is based on a growing cell structures algorithm.

5. The method of claim 1 wherein the similarity is calculated according to the following equation:

$$Sim(I, J) = \sum_{i,j} corr(X_i, Y_j)$$

where $I(X_1, \ldots, X_n)$ represents the target feature vectors of the target image, $J(Y_1, \ldots, Y_n)$ represents the feature vectors of a classified image, and $corr(X_i, Y_j)$ represents a metric that measures the correspondence between feature vectors.

6. The method of claim 1 including filtering out a matching image when an arrangement between its matching salient points and an arrangement of the corresponding similar salient points of the target image are inconsistent.

7. The method of claim 6 wherein the filtering out includes applying a RANSAC-based algorithm.

8. A computer system for classifying an object of a target image, comprising:

a classified images store containing classified images of objects and classifications of the objects;

a memory storing computer-executable instructions of a component that generates an index that maps each salient point of the classified images to the classified image that contains that salient point;

a component that generates clusters of salient points of the classified images whose feature vectors are similar, each cluster having salient points of a plurality of classified images whose feature vectors are within a threshold similarity of a representative feature vector of the cluster;

a component that, after the clusters are generated, generates target feature vectors for target salient points of the target image;

a component that identifies, from the generated index, classified images that match the target image based on similarity between the target feature vectors of the target salient points of the target image and feature vectors of the salient points of the classified images by, for each target salient point, identifying a cluster whose salient points have feature vectors that are most similar to the target feature vector of the target salient point;

identifying as candidate images those images that contain a salient point of the identified cluster and that are most similar to the target image based on the feature vectors of salient points of the images and the target feature vectors; and discarding identified candidate images whose arrangement of salient points is inconsistent with an arrangement of the target salient points, wherein the not discarded candidate images are the matching classified images; and a component that classifies the object of the target image based on the classifications of the matching classified images; and a processor for executing the computer-executable instructions stored in the memory.

9. The computer system of claim 8 wherein the salient points are identified using a difference of Gaussian algorithm.

10. The computer system of claim 8 wherein the clusters are identified using a growing cell structures algorithm.

11. The computer system of claim 8 wherein the component that identifies classified images that match includes a component that discards matching images whose similarity is not within a threshold similarity.

12. The computer system of claim 8 wherein the component that classifies the object of the target image selects the classification of a matching classified image based on number of similar salient points.

13. A computer-readable storage medium that is not a signal containing instructions for controlling a computing device to classify an object of a target image, by a method comprising:

provide an index that maps feature vectors for salient points of classified images to the classified images and their classifications;

providing a plurality of clusters of the salient points of the classified images, each cluster having salient points of a plurality of classified images whose feature vectors are within a threshold similarity of a representative feature vector of the cluster, each cluster having a mapping of each salient point of the cluster to the classified image that contains that salient point; and after the clusters are provided, generating target feature vectors for target salient points of the target image;

identifying, from the provided index, classified images that match the target image based on similarity between the target feature vectors of the target salient points of the target image and the feature vectors of salient points of the classified images by identifying clusters whose salient points have feature vectors that are similar to the target feature vectors and identifying as matching images the images that contain the salient points of the identified clusters and that are most similar to the target image; and selecting a classification for the object of the target image based on the classifications of the matching classified images.

14. The computer-readable storage medium of claim 13 wherein the identifying of classified images that match includes calculating a similarity between the target image and the matching classified images based on similar target salient points of the target image and the matching classified images.

15. The computer-readable storage medium of claim 14 wherein the selecting of a classification includes selecting a dominant classification of the matching classified images.

* * * * *